US012584013B2

(12) United States Patent
Son et al.

(10) Patent No.: US 12,584,013 B2
(45) Date of Patent: Mar. 24, 2026

(54) POLYCARBONATE COMPOUND COMPOSITION AND METHOD FOR PREPARING THE SAME

(71) Applicant: LG CHEM, LTD., Seoul (KR)

(72) Inventors: Youngwook Son, Daejeon (KR); Dayoung Lee, Daejeon (KR); Hyong Min Bahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 481 days.

(21) Appl. No.: 18/026,320

(22) PCT Filed: Jun. 9, 2022

(86) PCT No.: PCT/KR2022/008114
§ 371 (c)(1),
(2) Date: Mar. 14, 2023

(87) PCT Pub. No.: WO2022/260446
PCT Pub. Date: Dec. 15, 2022

(65) Prior Publication Data

US 2023/0348714 A1 Nov. 2, 2023

(30) Foreign Application Priority Data

Jun. 9, 2021 (KR) ........................ 10-2021-0075030
Jun. 8, 2022 (KR) ........................ 10-2022-0069251

(51) Int. Cl.
*C08L 69/00* (2006.01)

(52) U.S. Cl.
CPC .................................... *C08L 69/00* (2013.01)

(58) Field of Classification Search
CPC .............................. C08L 69/00; C08G 63/193
See application file for complete search history.

(56) References Cited

U.S. PATENT DOCUMENTS

| | | | | |
|---|---|---|---|---|
| 6,143,839 | A | 11/2000 | Webb et al. | |
| 2001/0016626 | A1 | 8/2001 | Vollenberg et al. | |
| 2005/0048299 | A1* | 3/2005 | Gallucci | C08K 5/42 428/473.5 |
| 2007/0155913 | A1 | 7/2007 | Chakravarti et al. | |
| 2013/0030113 | A1 | 1/2013 | Hitomi et al. | |
| 2013/0280535 | A1 | 10/2013 | Maas et al. | |
| 2014/0171583 | A1* | 6/2014 | Hur | C08K 5/523 524/537 |
| 2015/0299388 | A1* | 10/2015 | Hur | C08G 64/04 528/219 |
| 2015/0299462 | A1* | 10/2015 | Lee | C08L 51/003 525/185 |
| 2022/0356346 | A1 | 11/2022 | Shimokawa et al. | |

FOREIGN PATENT DOCUMENTS

| | | | | |
|---|---|---|---|---|
| CN | 1845959 | A | 10/2006 | |
| CN | 101356234 | A | 1/2009 | |
| CN | 102822276 | A | 12/2012 | |
| JP | H1081737 | A * | 3/1998 | G03G 5/056 |
| JP | 10-142827 | A | 5/1998 | |
| JP | 2000-221722 | A | 8/2000 | |
| JP | 2002107968 | A * | 4/2002 | |
| JP | 2002-524646 | A | 8/2002 | |
| JP | 2003207909 | A * | 7/2003 | |
| JP | 2004-277438 | A | 10/2004 | |
| JP | 3595636 | B2 | 12/2004 | |
| JP | 3658228 | B2 | 6/2005 | |
| JP | 2011-058336 | A | 3/2011 | |
| JP | 2020-175587 | A | 10/2020 | |
| KR | 10-2020-0080471 | A | 7/2020 | |
| TW | 202116865 | A | 5/2021 | |
| WO | 2000/026275 | A1 | 5/2000 | |
| WO | 2021/020116 | A1 | 2/2021 | |

OTHER PUBLICATIONS

English Machine Translation of JP 2002107968 (Year: 2025).*
Introduction to Plastics Engineering (Year: 2018).*
English machine translation of JP 2003207909 A (Year: 2025).*

* cited by examiner

*Primary Examiner* — Randy P Gulakowski
*Assistant Examiner* — Holly Grace Hester
(74) *Attorney, Agent, or Firm* — Bryan Cave Leighton Paisner LLP

(57) ABSTRACT

A polycarbonate compound composition and a method of preparing the same are provided. The polycarbonate compound composition comprises a polycarbonate including a repeating unit represented by Formula 1, and a polymer including a repeating unit represented by the following Formula 2, and has improved surface hardness while maintaining high impact strength.

[Formula 1]

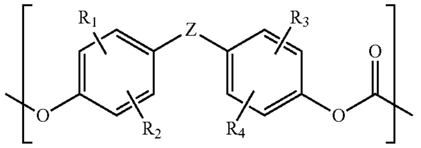

[Formula 2]

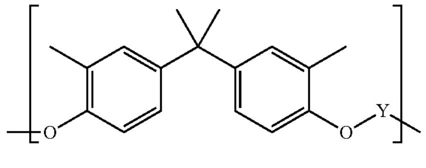

12 Claims, No Drawings

POLYCARBONATE COMPOUND COMPOSITION AND METHOD FOR PREPARING THE SAME

CROSS-REFERENCE TO RELATED APPLICATION

The present application is a National Stage Application of International Application No. PCT/KR2022/008114, filed on Jun. 9, 2022, which claims priority to Korean Patent Application No. 10-2021-0075030 filed on Jun. 9, 2021 and Korean Patent Application No. 10-2022-0069251 filed on Jun. 8, 2022, the disclosures of which are incorporated by reference herein in their entirety.

FIELD OF DISCLOSURE

The present disclosure provides a polycarbonate compound composition having excellent impact strength and surface hardness.

BACKGROUND

Polycarbonate resins are prepared by condensation-polymerization of an aromatic diol such as bisphenol A with a carbonate precursor such as phosgene. The polycarbonate resins have excellent impact strength, dimensional stability, heat resistance, transparency, etc., and thus are used in a wide range of applications, such as exterior materials of electrical and electronic products, automobile components, building materials, optical components, etc.

Recently, in order to apply these polycarbonate resins to more various fields, many studies have been made to obtain desired physical properties by copolymerizing two or more aromatic diol compounds having different structures from each other and introducing monomers having different structures into a main chain of the polycarbonate. In particular, as the recent demand for glass replacement plastic increases, it is necessary to study polycarbonate with suitable physical properties for use in interior/exterior materials.

On the other hand, although the existing scratch-resistant polycarbonate has excellent surface hardness, it has limitations in its application as an interior/exterior material due to its low impact strength. Therefore, it is necessary to develop polycarbonate having improved impact resistance at room temperature while maintaining the improved surface hardness property by supplementing the reduction in the impact strength of scratch-resistant polycarbonate.

Accordingly, as described below, the present inventors have found that a polycarbonate compound composition prepared by compounding the existing polycarbonate with a polymer including an ester repeating unit derived from aromatic diol overcomes the above challenges, thereby completing the present disclosure.

SUMMARY

There are provided a polycarbonate compound composition having excellent impact resistance at room temperature while maintaining the physical properties of the existing scratch-resistant polycarbonate, and a method of preparing the same.

In an aspect of the present disclosure, to solve the above noted problems, provided herein is a polycarbonate compound composition including a polycarbonate including a repeating unit represented by the following Formula 1; and a polymer including a repeating unit represented by the following Formula 2, wherein a weight average molecular weight of the polycarbonate including the repeating unit represented by Formula 1 is 10,000 g/mol to 100,000 g/mol, and the polymer including the repeating unit represented by Formula 2 is included in an amount of 10 parts by weight to 40 parts by weight:

[Formula 1]

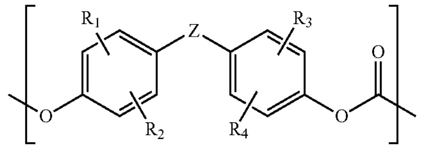

in Formula 1, $R_1$ to $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Formula 2]

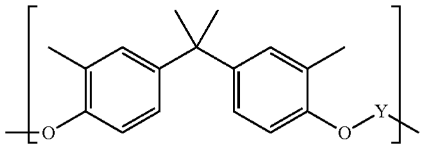

in Formula 2,

Y is a divalent organic group represented by the following Formula 2-1 or 2-2.

[Formula 2-1]

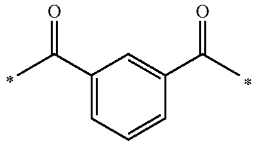

[Formula 2-2]

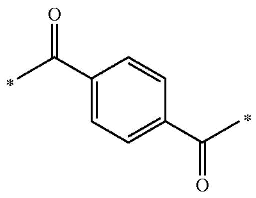

wherein,

* is a bonding site.

In another aspect of the present disclosure, also provided herein is a method of preparing the polycarbonate compound composition, the method including the steps of preparing the polycarbonate including the repeating unit represented by Formula 1 (step 1); preparing the polymer including the repeating unit represented by Formula 2 (step 2); and blending the polycarbonate with the polymer including the repeating unit represented by Formula 2 (step 3), wherein a weight average molecular weight of the polycarbonate including the repeating unit represented by Formula 1 is 10,000 g/mol to 100,000 g/mol, and the polymer including the repeating unit represented by Formula 2 is included in an amount of 10 parts by weight to 40 parts by weight.

The polycarbonate is prepared by condensation-polymerization of an aromatic diol compound such as bisphenol A with a carbonate precursor such as phosgene, and have excellent impact strength, dimensional stability, heat resistance, transparency, etc. Thus, the polycarbonate resins have application in a wide range of uses, such as exterior materials of electrical and electronic products, automobile components, building materials, optical components, etc. In particular, scratch-resistant polycarbonate with improved surface hardness is evaluated to have high potential application value, but generally has low impact strength, which limits its application to the market.

Accordingly, in the present disclosure, the impact strength of scratch-resistant polycarbonate may be improved by compounding the existing polycarbonate with a polymer including an ester repeating unit derived from aromatic diol.

Hereinafter, the present disclosure will be described in detail, and for the sake of convenience of classification and explanation of each component, the polycarbonate is referred to as a ‘first polymer’, and the polymer including the repeating unit represented by Formula 2 is referred to as a ‘second polymer’.

Polycarbonate (First Polymer)

The polycarbonate (first polymer) according to the present disclosure refers to a repeating unit produced by reacting an aromatic diol with a carbonate precursor.

Preferably, the polycarbonate (first polymer) includes a repeating unit represented by the following Formula 1:

[Formula 1]

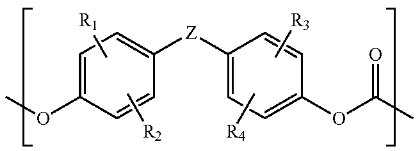

in Formula 1, $R_1$ to $R_4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Preferably, $R_1$ to $R_4$ are each independently, hydrogen, $C_{1-4}$ alkyl, or halogen. More preferably, $R_1$ to $R_4$ are each independently hydrogen, methyl, chloro, or bromo.

Further, preferably, Z is linear or branched $C_{1-10}$ alkylene unsubstituted or substituted with phenyl, and more preferably, methylene, ethane-1,1-diyl, propane-2,2-diyl, butane-2,2-diyl, 1-phenylethane-1,1-diyl, or diphenyl methylene. Further, Z is preferably cyclohexane-1,1-diyl, O, S, SO, $SO_2$, or CO.

Preferably, the compound represented by Formula 1 may be derived from any one or more aromatic diol compounds selected from the group consisting of bis(4-hydroxyphenyl) methane, bis(4-hydroxyphenyl)ether, bis(4-hydroxyphenyl) sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl) propane, 2,2-bis(4-hydroxy-3-methylphenyl)propane (bisphenol C), 2,2-bis(4-hydroxy-3,5-dimethylphenyl)propane, and 1,1-bis(4-hydroxyphenyl)-1-phenylethane.

The phrase ‘derived from aromatic diol compounds’ means that a hydroxy group of the aromatic diol compound is reacted with the carbonate precursor to form the repeating unit represented by Formula 1.

For example, when bisphenol A which is an aromatic diol compound is polymerized with triphosgene which is a carbonate precursor, the repeating unit represented by Formula 1 may be represented by the following Formula 1-1:

[Formula 1-1]

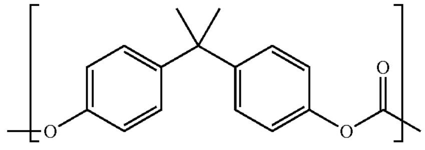

As the carbonate precursor, one or more selected from the group consisting of dimethyl carbonate, diethyl carbonate, dibutyl carbonate, dicyclohexyl carbonate, diphenyl carbonate, ditolyl carbonate, bis(chlorophenyl) carbonate, di-m-cresyl carbonate, dinaphthyl carbonate, bis(diphenyl) carbonate, phosgene, triphosgene, diphosgene, bromophosgene and bishaloformate may be used. Preferably, triphosgene or phosgene may be used.

A weight average molecular weight (Mw) of the polycarbonate (first polymer) may be 10,000 g/mol to 100,000 g/mol, based on a converted value with respect to a standard polycarbonate (PC Standard), as measured by gel permeation chromatography (GPC). When the weight average molecular weight of polycarbonate is less than 10,000 g/mol, mechanical properties of the compound composition may deteriorate, and when it is more than 100,000 g/mol, there may be a problem in that the compound composition is not uniformly prepared. More preferably, the weight average molecular weight may be 12,000 g/mol or more, 15,000 g/mol or more, 20,000 g/mol or more, 25,000 g/mol or more, 30,000 g/mol or more, 35,000 g/mol or more, 40,000 g/mol or more, 45,000 g/mol or more, and 70,000 g/mol or less, 65,000 g/mol or less, 60,000 g/mol or less, 55,000 g/mol or less, or 53,000 g/mol or less. Furthermore, the compound composition, in which the molecular weight of the first polymer is larger than that of the second polymer described later, may exhibit excellent impact strength at room temperature along with improved surface hardness property.

Second Polymer

Further, the polycarbonate compound composition according to the present disclosure includes a polymer (second polymer) including the repeating unit represented by Formula 2.

The repeating unit represented by Formula 2 is an ester repeating unit including an aromatic diol compound and a phthalate-based compound, and has a structure in which the phthalate-based compound bound with the aromatic diol is randomly repeated.

The existing polycarbonate receives attention as an interior and exterior material for automobiles or electrical and electronic products or as a glass replacement due to its excellent impact strength, heat resistance, transparency, etc. When the surface hardness of polycarbonate is increased, there is a problem in that the impact strength is lowered. Accordingly, the present inventors found that when the polymer including the repeating unit represented by Formula 2 is compounded with polycarbonate, the compound may exhibit improved impact resistance at room temperature while exhibiting excellent intrinsic properties of the existing polycarbonate.

Preferably, a weight average molecular weight of the polymer including the repeating unit represented by Formula 2 is 8,000 g/mol to 50,000 g/mol. More preferably, the weight average molecular weight of the polymer including the repeating unit represented by Formula 2 is 8,500 g/mol or more, 9,000 g/mol or more, or 10,000 g/mol or more, and 45,000 g/mol or less, 40,000 g/mol or less, or 37,000 g/mol or less. When the weight average molecular weight of the polymer including the repeating unit represented by Formula 2 is less than 8,000 g/mol, there is a problem in that the impact resistance at room temperature may be low, and when it is more than 50,000 g/mol, there is a problem in that flowability is too low, and thus the injection may be poor.

Preferably, the polycarbonate compound composition according to the present disclosure includes the polymer including the repeating unit represented by Formula 2 in an amount of 10 parts by weight to 40 parts by weight, based on 100 parts by weight of the polycarbonate compound composition. More preferably, the polymer including the repeating unit represented by Formula 2 is included in an amount of 11 parts by weight or more, 12 parts by weight or more, 13 parts by weight or more, 14 parts by weight or more, or 15 parts by weight or more, and 39 parts by weight or less, 38 parts by weight or less, 37 parts by weight or less, 36 parts by weight or less, or 35 parts by weight or less, based on 100 parts by weight of the polycarbonate compound composition.

Polycarbonate Compound Composition

The polycarbonate compound composition according to the present disclosure is a composition in which the polycarbonate (first polymer) and the polymer (second polymer) including the repeating unit represented by Formula 2 are blended.

As described, the polycarbonate compound composition prepared by blending heterogeneous polymers may exhibit various physical properties other than the intrinsic physical properties of respective unit polymers or may complement physical properties of respective polymers through blending of the heterogeneous polymers. In the present disclosure, the polycarbonate (first polymer) having a weight average molecular weight of 10,000 to 100,000 g/mol and the second polymer according to the present disclosure are included in an amount of 10 parts by weight to 40 parts by weight, thereby improving the surface hardness while maintaining the impact strength.

Preferably, the weight average molecular weight of the polycarbonate compound composition is 10,000 g/mol to 100,000 g/mol. More preferably, it is 15,000 g/mol or more, 20,000 g/mol or more, 25,000 g/mol or more, 30,000 g/mol or more, 35,000 g/mol or more, 40,000 g/mol or more, or 45,000 g/mol or more, and 85,000 g/mol or less, 80,000 g/mol or less, 75,000 g/mol or less, or 70,000 g/mol or less.

Preferably, an impact strength at room temperature of the polycarbonate compound composition according to the present disclosure is 500 J/m to 1,000 J/m, as measured at 23° C. in accordance with ASTM D256 (⅛ inch, Notched Izod). More preferably, the impact strength at room temperature is 550 J/m or more, 575 J/m or more, or 6000 J/m or more. Further, the impact strength at room temperature is better as the value is higher, and thus there is no upper limit. For example, it may be 990 J/m or less, 980 J/m or less, or 970 J/m or less.

Preferably, a pencil hardness of the polycarbonate compound composition according to the present disclosure is HB or more, as measured in accordance with ASTM D3363.

Method of Preparing Polycarbonate Compound Composition

A method of preparing the polycarbonate compound composition according to the present disclosure may include the steps of preparing the polycarbonate including the repeating unit represented by Formula 1 (step 1); preparing the polymer including the repeating unit represented by Formula 2 (step 2); and blending the polycarbonate with the polymer including the repeating unit represented by Formula 2 (step 3), wherein a weight average molecular weight of the polycarbonate including the repeating unit represented by Formula 1 is 10,000 g/mol to 100,000 g/mol, and the polymer including the repeating unit represented by Formula 2 is included in an amount of 10 parts by weight to 40 parts by weight.

The step 1 is preparing the first polymer which is the polycarbonate including the repeating unit represented by Formula 1, and may follow a general method of preparing polycarbonate by reacting an aromatic diol compound with a carbonate precursor.

For example, the reaction of the carbonate precursor and the aromatic diol compound may be performed by an interfacial polymerization method. The interfacial polymerization means that an organic solvent containing the carbonate precursor and an aqueous solution containing the aromatic diol compound are mixed together, and polymerization occurs at their phase interface.

In this case, it is possible to perform the polymerization reaction at normal pressure and at a low temperature, and it is easy to control the molecular weight. The interfacial polymerization may be performed in the presence of an acid binder and an organic solvent. In addition, the interfacial polymerization may include, for example, the step of adding a coupling agent after pre-polymerization and then performing polymerization again. In this case, polycarbonate having a high molecular weight may be obtained.

The materials used in the interfacial polymerization are not particularly limited as long as they are materials applicable to the polymerization of polycarbonate, and the amount used therein may be adjusted as needed.

The acid binder is a transesterification catalyst, and may include basic compounds such as Group 1 or 2 metal compounds, basic boron compounds, basic phosphorus compounds, basic ammonium compounds, amine compounds, etc.

The Group 1 metal compounds may include, for example, sodium hydroxide, potassium hydroxide, lithium hydroxide, cesium hydroxide, sodium hydrogen carbonate, potassium hydrogen carbonate, lithium hydrogen carbonate, cesium hydrogen carbonate, sodium carbonate, potassium carbonate, lithium carbonate, cesium carbonate, sodium acetate, potassium acetate, lithium acetate, cesium acetate, sodium stearate, potassium stearate, lithium stearate, cesium stearate, sodium borohydride, potassium borohydride, lithium borohydride, cesium borohydride, phenylated sodium boron, phenylated potassium boron, phenylated lithium boron, phenylated cesium boron, sodium benzoate, potassium benzoate, lithium benzoate, cesium benzoate, disodium hydrogenphosphate, dipotassium hydrogenphosphate, dilithium hydrogenphosphate, dicesium hydrogenphosphate, disodium phenylphosphate, dipotassium phenylphosphate, dilithium phenylphosphate, dicesium phenylphosphate, an alcoholate or a phenolate of sodium, potassium, lithium or cesium, or disodium salt, dipotassium salt, dilithium salt or dicesium salt of bisphenol A, etc.

Further, the Group 2 metal compounds may include, for example, calcium hydroxide, barium hydroxide, magnesium hydroxide, strontium hydroxide, calcium hydrogen carbonate, barium hydrogen carbonate, magnesium hydrogen carbonate, strontium hydrogen carbonate, calcium carbonate, barium carbonate, magnesium carbonate, strontium carbonate, calcium acetate, barium acetate, magnesium acetate, strontium acetate, calcium stearate, barium stearate, magnesium stearate, strontium stearate, etc.

The organic solvent is not particularly limited as long as it is a solvent that is usually used in the polymerization of polycarbonates. For example, halogenated hydrocarbons such as methylene chloride, chlorobenzene, etc., may be used.

Further, to control the molecular weight of the polycarbonate during polymerization, the polymerization may be preferably carried out in the presence of a molecular weight modifier. In particular, the weight average molecular weight of polycarbonate according to the present disclosure may be controlled to 10,000 g/mol to 100,000 g/mol. As the molecular weight modifier, $C_{1-20}$ alkyl phenol may be used. Specific examples thereof may include p-tert-butyl phenol, p-cumyl phenol, decyl phenol, dodecyl phenol, tetradecyl phenol, hexadecyl phenol, octadecyl phenol, eicosyl phenol, docosyl phenol, triacontyl phenol, etc. The molecular weight modifier may be added before the initiation of polymerization, during the initiation of polymerization, or after the initiation of polymerization. The molecular weight modifier may be, for example, included in an amount of 0.01 part by weight or more, 0.1 part by weight or more, or 1 part by weight or more, and 10 parts by weight or less, 6 parts by weight or less, or 5 parts by weight or less, based on 100 parts by weight of the aromatic diol compound. Within the above range, a desired molecular weight may be obtained.

Further, during the interfacial polymerization, a reaction accelerator, for example, a tertiary amine compound, a quaternary ammonium compound, or a quaternary phosphonium compound, such as triethylamine, tetra-n-butylammonium bromide, tetra-n-butylphosphonium bromide, etc., may be further used for accelerating the reaction.

In the interfacial polymerization, a reaction temperature may be 0° C. to 40° C., and a reaction time may be 10 minutes to 5 hours. Further, during the reaction, pH may be preferably maintained at 9 or more, or 11 or more.

After preparing the polycarbonate by the polymerization reaction, the step of filtering or drying, etc. may be further performed to provide the polycarbonate.

In the method of preparing the polycarbonate compound composition of the present disclosure, the step 2 is preparing the second polymer including the ester repeating unit which is a repeating unit represented by Formula 2.

According to one embodiment of the present disclosure, the step 2 includes the step of polymerizing bisphenol C and compounds represented by the following Formula 3-1 and Formula 3-2:

[Formula 3-1]

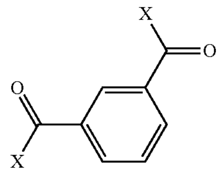

-continued

[Formula 3-2]

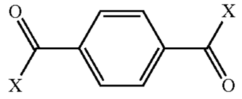

in Formula 3-1 and Formula 3-2,

X is halogen.

More preferably, X is bromo or chloro.

The method of preparing the repeating unit represented by Formula 2 is the same as in the following Reaction Scheme 1:

[Reaction Scheme 1]

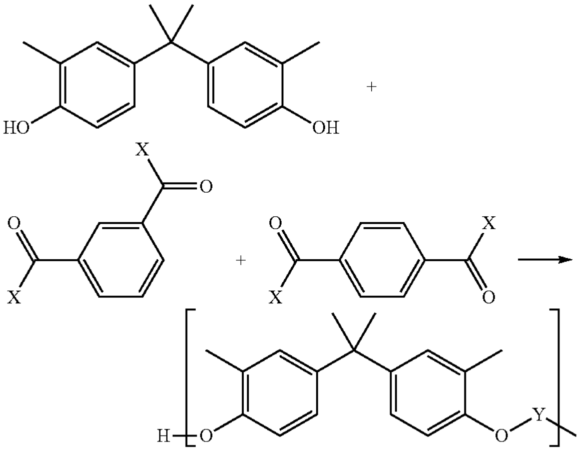

in Reaction Scheme 1, X and Y are the same as defined above.

The repeating unit represented by Formula 2 of the present disclosure is prepared by reacting an aromatic diol compound with two or more kinds of polyfunctional acyl halide compounds, as in Reaction Scheme 1. Specifically, the repeating unit may be prepared through an esterification reaction of aromatic diol with polyfunctional acyl halide. Since two or more kinds of acyl halides are used, it has a structure in which terephthalate units derived from acyl halide are randomly repeated.

Preferably, the compounds represented by Formula 3-1 and Formula 3-2 may be used in an amount of 0.1 equivalent to 1 equivalent, more preferably, in an amount of 0.15 equivalents or more, 0.2 equivalents or more, 0.3 equivalents or more, and 0.95 equivalents or less, 0.9 equivalents or less, or 0.85 equivalents or less with respect to the equivalent of bisphenol C, respectively. When the compounds represented by Formula 3-1 and Formula 3-2 are used in an amount of less than 0.1 equivalent with respect to the equivalent of bisphenol C, respectively, there is a problem in that oligomers are not formed, and when the amount is more than 1 equivalent, there is a problem in that unreacted materials may be generated.

For example, the aromatic diol used in the preparation of the repeating unit represented by Formula 2 may be bisphenol C (BPC), and the polyfunctional acyl halide may be isophthaloyl chloride (IPCl), terephthaloyl chloride (TPCl), or a mixture thereof.

Further, in the method of preparing the polycarbonate compound composition of the present disclosure, the step 3 is blending the polycarbonate prepared in the step 1 with the polymer including the ester repeating unit prepared in the step 2.

As described above, the polycarbonate compound composition of the present disclosure is prepared by blending heterogeneous polymers, and may include 10 parts by weight to 40 parts by weight of the polymer including the repeating unit represented by Formula 2, thereby maintaining impact strength of the existing polycarbonate while increasing surface hardness.

With regard to the blending of the step 3 of the present disclosure, the method of blending the polymers may be performed by using a technique generally known in the art, but there is no particular limitation, by a method such as melt kneading, etc.

According to one embodiment of the present disclosure, provided is a molded article formed from the polycarbonate compound composition.

The molded article may be applied to a wide range of fields such as interior and exterior materials for electric and electronic products, automobile parts, building materials, optical parts, clothing materials, etc.

Since the molded article is manufactured using the polycarbonate compound composition described above, it may exhibit high scratch-resistant while exhibiting excellent properties of polycarbonate. Accordingly, it is expected that the molded article may be applied to a field where the application is limited due to the low surface hardness of the existing polycarbonate molded article.

A method of providing the molded article from the polycarbonate compound composition is not particularly limited. For non-limiting example, the molded article may be provided by adding, to the polycarbonate composition, additives commonly used in the art to which the present disclosure pertains, as needed, and then mixing therewith, and extruding the mixture using an extruder to produce pellets, drying the pellets, and then injecting the pellets using an injection molding machine.

The mixing of the polycarbonate compound composition may be carried out by a melt-kneading method, for example, by a method of using a ribbon blender, Henschel mixer, Banbury mixer, drum tumbler, single screw extruder, twin screw extruder, co-kneader, or multi-screw extruder. The temperature during melt-kneading may be appropriately controlled, as needed.

Next, the melt-kneaded product or pellet is used as a raw material, and a molding method such as an injection molding method, an injection compression molding method, an extrusion molding method, a vacuum molding method, a blow molding method, a press molding method, an air pressure molding method, a foam molding method, a heat bending molding method, a compression molding method, a calendar molding method, and a rotational molding method may be applied.

In the case of using the injection molding method, the polycarbonate composition is placed under high temperature conditions of 200° C. to 400° C. It is preferred that since the polycarbonate composition has excellent heat resistance, there is little occurrence of polymer modification or yellowing in the above-described melt-kneading or injection process.

The size and thickness of the molded article may be appropriately adjusted according to the purpose of use, and the shape thereof may also have the form of a flat plate or a curved surface according to the purpose of use.

As described above, the molded article according to another embodiment may exhibit high scratch-resistant while retaining excellent properties such as excellent impact resistance unique to polycarbonate, thereby being applied to various fields.

As described above, a polycarbonate compound composition including polycarbonate and a specific ester repeating unit according to the present disclosure is characterized by having excellent surface hardness while maintaining basic physical properties of polycarbonate.

DETAILED DESCRIPTION

Hereinafter, preferred exemplary embodiments will be provided for better understanding of the present disclosure. However, the following exemplary embodiments are provided only for illustrating the present disclosure, but the present disclosure is not limited thereby.

EXAMPLES

Preparation Example 1-1: Preparation of Polycarbonate (50,000 g/mol)

620 g of water, 116.47 g of bisphenol A (BPA), 102.5 g of a 40 wt % NaOH aqueous solution, and 200 ml of $MeCl_2$ were added to a 2 L main reactor that was equipped with a nitrogen purge device and a condenser, and maintained at room temperature by a circulator, followed by stirring for several minutes.

Nitrogen purging was stopped, 62 g of triphosgene and 120 g of $MeCl_2$ were placed in a 1 L round bottom flask, triphosgene was dissolved therein, and the dissolved triphosgene solution was slowly added to the main reactor. After the addition was completed, 2.66 g of p-tert-butylphenol (PTBP) was added and stirred for 10 minutes. Thereafter, 97 g of a 40 wt % NaOH aqueous solution was added, and 1.16 g of TEA as a coupling agent was added. At this time, reaction pH was maintained at 11 to 13.

After the solution was allowed to stand for a time for sufficient reaction, pH was decreased to 3~4 by addition of HCl to terminate the reaction. Then, stirring was stopped, an organic layer and an aqueous layer were separated, and the aqueous layer was removed, and pure $H_2O$ was added again, and the washing process was repeated 3 times to 5 times.

After the washing was completely carried out, only the organic layer was extracted, and the polymer crystals were obtained by re-precipitation using a non-solvent of methanol, $H_2O$, etc. In this regard, a weight average molecular weight of the prepared polycarbonate was 50,000 g/mol.

Preparation Example 1-2: Preparation of Polycarbonate (51,000 g/mol)

A polycarbonate was prepared in the same manner as in Preparation Example 1-1, except that 2.6 g of p-tert-butylphenol (PTBP) was used. A weight average molecular weight of the obtained polycarbonate was 51,000 g/mol.

Preparation Example 1-3: Preparation of Polycarbonate (49,000 g/mol)

A polycarbonate was prepared in the same manner as in Preparation Example 1-1, except that 2.7 g of p-tert-butylphenol (PTBP) was used. A weight average molecular weight of the obtained polycarbonate was 49,000 g/mol.

Preparation Example 1-4: Preparation of Polycarbonate (46,000 g/mol)

A polycarbonate was prepared in the same manner as in Preparation Example 1-1, except that 2.9 g of p-tertbutylphenol (PTBP) was used. A weight average molecular weight of the obtained polycarbonate was 46,000 g/mol.

Preparation Example 1-5: Preparation of Polycarbonate (36,000 g/mol)

A polycarbonate was prepared in the same manner as in Preparation Example 1-1, except that 3.7 g of p-tert-butylphenol (PTBP) was used. A weight average molecular weight of the obtained polycarbonate was 36,000 g/mol.

Preparation Example 1-6: Preparation of Polycarbonate (8,000 g/mol)

A polycarbonate was prepared in the same manner as in Preparation Example 1-1, except that 22.8 g of p-tert-butylphenol (PTBP) was used. A weight average molecular weight of the obtained polycarbonate was 8,000 g/mol.

Preparation Example 2-1: Preparation of Ester Polymer (BPCIPTP, 10,000 g/mol)

Bisphenol C (BPC, 23.86 g, 0.093 mol), terephthaloyl chloride (TPCl, 10.5 g, 0.052 mol), and isophthaloyl chloride (IPCl, 10.5 g, 0.052 mol) were dispersed/dissolved in methylene chloride. Then, triethylamine (TEA, 36.66 ml) was slowly added dropwise and stirred at room temperature for 4 hours or longer. Thereafter, the reaction was terminated using 1N HCl, and then the stirred reaction product was washed several times with distilled water using a separatory funnel. Thereafter, the solvent was removed using a rotary vacuum evaporator and dried at 120° C. overnight to obtain a solid. A molecular weight of the obtained polymer (BPCIPTP) was 10,000 g/mol.

Preparation Example 2-2: Preparation of Ester Polymer (BPCIPTP, 20,000 g/mol)

A polymer was prepared in the same manner as in Preparation Example 2-1, except that 26 g of BPC, 11 g of TPCl, and 11 g of IPCl were used. A molecular weight of the obtained polymer (BPCIPTP) was 20,000 g/mol.

Preparation Example 2-3: Preparation of Ester Polymer (BPCIPTP, 30,000 g/mol)

A polymer was prepared in the same manner as in Preparation Example 2-1, except that 26 g of BPC, 10 g of TPCl, and 10 g of IPCl were used. A molecular weight of the obtained polymer (BPCIPTP) was 30,000 g/mol.

Preparation Example 2-4: Preparation of Ester Polymer (BPCIPTP, 35,000 g/mol)

A polymer was prepared in the same manner as in Preparation Example 2-1, except that 26 g of BPC, 10.5 g of TPCl, and 10.5 g of IPCl were used. A molecular weight of the obtained polymer (BPCIPTP) was 35,000 g/mol.

Comparative Preparation Example 2-1: Preparation of Ester Polymer (BPAIPTP, 20,000 g/mol)

A polymer was prepared in the same manner as in Preparation Example 2-1, except that BPA was used instead of BPC. A molecular weight of the obtained polymer (BPAIPTP) was 20,000 g/mol.

Comparative Preparation Example 2-2: Preparation of Ester Polymer (ResorcinolIPTP, 20,000 g/mol)

A polymer was prepared in the same manner as in Preparation Example 2-1, except that Resorcinol was used instead of BPC. A molecular weight of the obtained polymer (ResorcinolIPTP) was 20,000 g/mol.

Example 1

Polycarbonate (50,000 g/mol) prepared in Preparation Example 1-1 and BPCIPTP (10,000 g/mol) prepared in Preparation Example 2-1 were blended at a weight ratio of 85:15, and 500 ppm of Irgafos 168 (BASF Corp.) as an antioxidant was added to prepare a polycarbonate compound composition.

Thereafter, the polycarbonate compound composition was supplied to an extruder (HAAKE Rheomex OS Single Screw Extruder), melt-kneaded at a barrel temperature of 250° C., and then pelletized. Injection molding was performed using an injection molding machine (BABYPLAST 6/10P) at a cylinder temperature of 270° C. at a mold temperature of 80° C. without residence time to prepare a specimen with a thickness of 3 mm for measuring surface hardness and a specimen with a thickness of 3.175 mm (⅛ inch) for measuring impact strength, respectively.

Example 2

A polycarbonate compound composition was prepared in the same manner as in Example 1, except that polycarbonate (51,000 g/mol) prepared in Preparation Example 1-2 and BPCIPTP (35,000 g/mol) prepared in Preparation Example 2-4 were blended at a weight ratio of 65:35.

Example 3

A polycarbonate compound composition was prepared in the same manner as in Example 1, except that polycarbonate (50,000 g/mol) prepared in Preparation Example 1-1 and BPCIPTP (20,000 g/mol) prepared in Preparation Example 2-2 were blended at a weight ratio of 85:15.

Example 4

A polycarbonate compound composition was prepared in the same manner as in Example 1, except that polycarbonate (51,000 g/mol) prepared in Preparation Example 1-2 and BPCIPTP (30,000 g/mol) prepared in Preparation Example 2-3 were blended at a weight ratio of 65:35.

Example 5

A polycarbonate compound composition was prepared in the same manner as in Example 1, except that polycarbonate (51,000 g/mol) prepared in Preparation Example 1-2 and BPCIPTP (20,000 g/mol) prepared in Preparation Example 2-2 were blended at a weight ratio of 75:25.

Example 6

A polycarbonate compound composition was prepared in the same manner as in Example 1, except that polycarbonate (36,000 g/mol) prepared in Preparation Example 1-5 and BPCIPTP (20,000 g/mol) prepared in Preparation Example 2-2 were blended at a weight ratio of 65:35.

Comparative Example 1

The polycarbonate of Preparation Example 1-3 was used. The polycarbonate was supplied to an extruder (HAAKE Rheomex OS Single Screw Extruder), melt-kneaded at a barrel temperature of 250° C., and then pelletized. Injection molding was performed using an injection molding machine (BABYPLAST 6/10P) at a cylinder temperature of 270° C. at a mold temperature of 80° C. without residence time to prepare a specimen with a thickness of 3 mm for measuring surface hardness and a specimen with a thickness of 3.175 mm (⅛ inch) for measuring impact strength, respectively.

Comparative Example 2

A polycarbonate compound composition was prepared in the same manner as in Example 1, except that polycarbonate (50,000 g/mol) prepared in Preparation Example 1-1 and BPAIPTP (20,000 g/mol) prepared in Comparative Preparation Example 2-1 were blended at a weight ratio of 85:15.

Comparative Example 3

A polycarbonate compound composition was prepared in the same manner as in Example 1, except that polycarbonate (51,000 g/mol) prepared in Preparation Example 1-2 and ResorcinolIPTP (20,000 g/mol) prepared in Comparative Preparation Example 2-2 were blended at a weight ratio of 85:15.

Comparative Example 4

620 g of water, 98.99 g of bisphenol A (BPA), 19.61 g of bisphenol C (BPC), 102.5 g of a 40 wt % NaOH aqueous solution, and 200 ml of $MeCl_2$ were added to a 2 L main reactor that was equipped with a nitrogen purge device and a condenser, and maintained at room temperature by a circulator, followed by stirring for several minutes.

Nitrogen purging was stopped, 62 g of triphosgene and 120 g of $MeCl_2$ were placed in a 1 L round bottom flask, triphosgene was dissolved therein, and the dissolved triphosgene solution was slowly added to the main reactor. After the addition was completed, 2.66 g of p-tert-butylphenol (PTBP) was added and stirred for 10 minutes. Thereafter, 97 g of a 40 wt % NaOH aqueous solution was added, and 1.16 g of TEA as a coupling agent was added. At this time, reaction pH was maintained at 11 to 13.

After the solution was allowed to stand for a time for sufficient reaction, pH was decreased to 3~4 by addition of HCl to terminate the reaction. Then, stirring was stopped, an organic layer and an aqueous layer were separated, and the aqueous layer was removed, and pure $H_2O$ was added again, and the washing process was repeated 3 times to 5 times.

After the washing was completely carried out, only the organic layer was extracted, and the polymer crystals were obtained by re-precipitation using a non-solvent of methanol, $H_2O$, etc. In this regard, a weight average molecular weight of the prepared polymer (BPC polycarbonate) was 49,000 g/mol.

Comparative Example 5

A polymer was prepared in the same manner as in Comparative Example 4, except that 82.53 g of bisphenol A (BPA) and 39.23 g of bisphenol C (BPC) were used. A weight average molecular weight of the obtained polymer (BPC polycarbonate) was 49,000 g/mol.

Comparative Example 6

A polycarbonate compound composition was prepared in the same manner as in Example 1, except that polycarbonate (46,000 g/mol) prepared in Preparation Example 1-4 and BPCIPTP (20,000 g/mol) prepared in Preparation Example 2-2 were blended at a weight ratio of 55:45.

Comparative Example 7

A polycarbonate compound composition was prepared in the same manner as in Example 1, except that polycarbonate (46,000 g/mol) prepared in Preparation Example 1-4 and BPCIPTP (20,000 g/mol) prepared in Preparation Example 2-2 were blended at a weight ratio of 95:5.

Comparative Example 8

A polycarbonate compound composition was prepared in the same manner as in Example 1, except that polycarbonate (8,000 g/mol) prepared in Preparation Example 1-6 and BPCIPTP (20,000 g/mol) prepared in Preparation Example 2-2 were blended at a weight ratio of 65:35.

The polycarbonate compound compositions of Examples and Comparative Examples are summarized in Table 1 below.

TABLE 1

| | Molecular weight of polycarbonate (g/mol) | Kind of compound polymer | Content of compound polymer (%) | Molecular weight of compound polymer (g/mol) |
|---|---|---|---|---|
| Example 1 | 50,000 | BPCIPTP | 15 | 10,000 |
| Example 2 | 51,000 | BPCIPTP | 35 | 35,000 |
| Example 3 | 50,000 | BPCIPTP | 15 | 20,000 |
| Example 4 | 51,000 | BPCIPTP | 35 | 30,000 |
| Example 5 | 51,000 | BPCIPTP | 25 | 20,000 |
| Example 6 | 36,000 | BPCIPTP | 35 | 20,000 |
| Comparative Example 1 | 49,000 | — | — | — |
| Comparative Example 2 | 50,000 | BPAIPTP | 15 | 20,000 |
| Comparative Example 3 | 51,000 | ResorcinolIPTP | 15 | 20,000 |
| Comparative Example 6 | 46,000 | BPCIPTP | 45 | 20,000 |
| Comparative Example 7 | 46,000 | BPCIPTP | 5 | 20,000 |
| Comparative Example 8 | 8,000 | BPCIPTP | 35 | 20,000 |

EXPERIMENTAL EXAMPLE

Preparation of Specimen 0.050 parts by weight of tris(2,4-di-tert-butylphenyl) phosphite, 0.010 part by weight of octadecyl-3-(3,5-di-tert-butyl-4-hydroxyphenyl)propionate, and 0.030 parts by weight of pentaerythritol tetrastearate were added with respect to 1 part by weight of each polycarbonate compound composition prepared in Examples and Comparative Examples, and pelletized using a Φ30 mm twin-screw extruder equipped with a vent. Injection molding was performed using a N-20C injection molding machine (JSW Co., Ltd.) at a cylinder temperature of 300° C. and a mold temperature of 80° C. to prepare each specimen.

The properties of the specimens were measured by the following methods, and the results are shown in Table 2 below.

Pencil Hardness

The pencil hardness was measured in accordance with ASTM D 3363. In detail, the angle of the pencil was fixed at 45°, and then the surface of the specimen was scratched by about 6.5 mm to evaluate whether scratches were observed with the naked eye, and the experiment was repeated by changing the hardness of the pencil.

Weight Average Molecular Weight 200 mg of the polymer resin was diluted in 200 ml of tetrahydrofuran (THF) solvent to prepare about 1000 ppm of a sample, and its molecular weight was measured through an RI detector at a flow rate of 1 ml/min using an Agilent 1200 series GPC instrument. As a standard for calculating the molecular weight of the sample, 8 kinds of PS standards were used to obtain a calibration curve, and based on this curve, the molecular weight of the sample was determined.

Impact Strength

Impact strength was measured in accordance with ASTM D256 (⅛ inch, Notched Izod) at 23° C.

Transmittance

Transmittance in the range of about 350 nm to about 1050 nm was measured using UltraScan PRO (manufactured by HunterLab) in accordance with ASTM D8003.

TABLE 2

| | Pencil hardness | Weight average molecular weight (g/mol) | Impact strength (J/m) | Transmittance (3T, %) |
|---|---|---|---|---|
| Example 1 | HB | 49,000 | 700 | 89 |
| Example 2 | H | 49,000 | 610 | 88 |
| Example 3 | HB | 49,000 | 740 | 89 |
| Example 4 | H | 49,000 | 620 | 88 |
| Example 5 | HB | 50,000 | 670 | 89 |
| Example 6 | H | 35,000 | 350 | 88 |
| Comparative Example 1 | 2B | 49,000 | 710 | 89 |
| Comparative Example 2 | 2B | 49,000 | 640 | 88 |
| Comparative Example 3 | 2B | 49,000 | 690 | 89 |
| Comparative Example 4 | HB | 49,000 | 120 | 89 |
| Comparative Example 5 | F | 49,000 | 120 | 89 |
| Comparative Example 6 | H | 34,000 | 280 | 86 |
| Comparative Example 7 | 2B | 45,000 | 730 | 89 |
| Comparative Example 8 | H | 16,000 | 55 | 79 |

As shown in Table 2, it was confirmed that the polycarbonate compound compositions according to the present disclosure exhibited excellent pencil hardness while having similar impact strength at room temperature and transmittance, as compared to the existing polycarbonate composition.

The invention claimed is:

1. A polycarbonate compound composition comprising a polymer blend of:

a polycarbonate including a repeating unit represented by the following Formula 1; and a polymer including a repeating unit represented by the following Formula 2, wherein a weight average molecular weight of the polycarbonate including the repeating unit represented by Formula 1 is 10,000 g/mol to 100,000 g/mol, the polycarbonate including the repeating unit represented by Formula 1 is included in an amount of 60 parts by weight to 90 parts by weight in the polycarbonate compound composition, and the polymer including the repeating unit represented by Formula 2 is included in an amount of 10 parts by weight to 40 parts by weight,

[Formula 1]

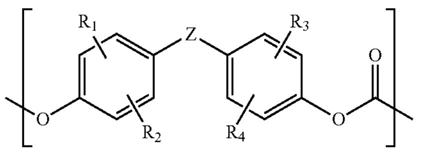

wherein,

R1 to R4 are each independently hydrogen, C1-10 alkyl, C1-10 alkoxy, or halogen, and Z is C1-10 alkylene unsubstituted or substituted with phenyl, C3-15 cycloalkylene unsubstituted or substituted with C1-10 alkyl, O, S, SO, SO2, or CO,

[Formula 2]

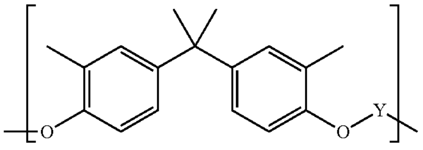

wherein,

Y is a divalent organic group represented by the following Formula 2-1 or 2-2,

[Formula 2-1]

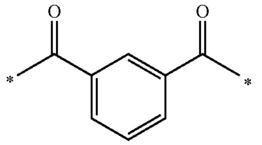

[Formula 2-2]

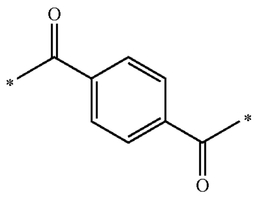

wherein,

* is a bonding site.

2. The polycarbonate compound composition of claim 1, wherein the repeating unit represented by Formula 1 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, 2,2-bis(4-hydroxyphenyl)propane (bisphenol A), 2,2-bis(4-hydroxyphenyl)butane, 1,1-bis(4-hydroxyphenyl)cyclohexane (bisphenol Z), 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane (bisphenol C), 2,2-bis(4-hydroxy-3,5-dimethylphenyl)propane, and 1,1-bis(4-hydroxyphenyl)-1-phenylethane.

3. The polycarbonate compound composition of claim 1, wherein the repeating unit represented by Formula 1 is the following Formula 1-1:

[Formula 1-1]

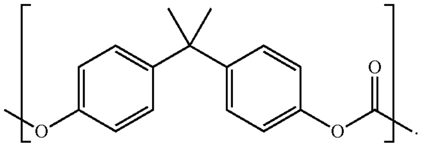

4. The polycarbonate compound composition of claim 1, wherein a weight average molecular weight of the polycarbonate including the repeating unit represented by Formula 1 is 12,000 g/mol to 70,000 g/mol.

5. The polycarbonate compound composition of claim 1, wherein a weight average molecular weight of the polymer including the repeating unit represented by Formula 2 is 8,000 g/mol to 50,000 g/mol.

6. The polycarbonate compound composition of claim 1, wherein the polymer including the repeating unit represented by Formula 2 is included in an amount of 15 parts by weight to 35 parts by weight, based on 100 parts by weight of the polycarbonate compound composition.

7. The polycarbonate compound composition of claim 1, wherein a weight average molecular weight of the polycarbonate compound composition is 10,000 g/mol to 100,000 g/mol.

8. The polycarbonate compound composition of claim 1, wherein a pencil hardness of the polycarbonate compound composition is HB or more, as measured in accordance with ASTM D3363.

9. The polycarbonate compound composition of claim 1, wherein an Izod impact strength at room temperature of the polycarbonate compound composition is 500 J/m to 1,000 J/m, as measured in accordance with ASTM D256 (⅛ inch, Notched Izod) at 23° C.

10. A method of preparing the polycarbonate compound composition of claim 1, the method comprising:

preparing the polycarbonate including a repeating unit represented by Formula 1 (step 1);

preparing the polymer including a repeating unit represented by Formula 2 (step 2); and blending the polycarbonate with the polymer including the repeating unit represented by Formula 2 (step 3).

11. The method of claim 10, wherein the step 2 includes polymerizing bisphenol C with compounds represented by the following Formula 3-1 and Formula 3-2:

[Formula 3-1]

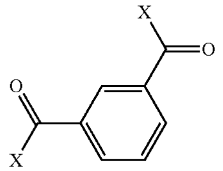

[Formula 3-2]

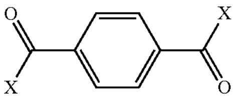

wherein,

X is halogen.

12. The method of claim 11, wherein the compounds represented by Formula 3-1 and Formula 3-2 are used in an amount of 0.1 equivalent to 1 equivalent, respectively, based on the equivalent of bisphenol C, respectively.

* * * * *